United States Patent [19]

Schumann

[11] Patent Number: 4,500,182
[45] Date of Patent: Feb. 19, 1985

[54] PHOTOPLOTTER

[75] Inventor: Robert W. Schumann, Madison, Wis.

[73] Assignee: Nicolet Instrument Corporation, Madison, Wis.

[21] Appl. No.: 453,481

[22] Filed: Dec. 27, 1982

[51] Int. Cl.³ .............................................. G03B 41/00
[52] U.S. Cl. ........................................................ 354/4
[58] Field of Search ........................ 354/4, 6; 364/520

[56] References Cited

U.S. PATENT DOCUMENTS

| | | | |
|---|---|---|---|
| 3,686,675 | 8/1972 | Faul et al. | 354/4 X |
| 3,695,154 | 10/1972 | Webster | 354/4 |
| 3,881,098 | 4/1975 | Rich | 354/4 X |
| 3,927,411 | 12/1975 | Lee et al. | 354/4 |
| 3,950,763 | 4/1976 | Parks et al. | 354/4 |
| 4,209,240 | 6/1980 | Sutherland et al. | 354/4 |

FOREIGN PATENT DOCUMENTS

| | | |
|---|---|---|
| 082479(A1) | 6/1983 | European Pat. Off. |
| 1156061 | 6/1969 | United Kingdom |
| 1308030 | 2/1973 | United Kingdom |
| 1454106 | 10/1976 | United Kingdom |
| 2072104A | 9/1981 | United Kingdom |

*Primary Examiner*—John Gonzales
*Attorney, Agent, or Firm*—Kinney & Lange

[57] ABSTRACT

A photoplotter wherein a relative movement is produced between a photosensitive media and a radiant energy pattern generated on the media. The relative movement is in accordance with a desired exposure trace on the media. A difference between actual and desired relative movement is detected and the radiant energy pattern is varied to compensate for that difference. In a preferred embodiment, the radiant energy pattern is established by a pattern generator which displays an alterable pattern object on its face the position of the pattern object on the face being variable to compensate for the difference between actual and desired relative movement. The pattern object may be generated as a linear trace on a cathode ray tube (CRT) with the number of linear traces generated per unit of time being dependent on the relative movement velocity. The pattern images on the media resulting from the linear CRT traces or pattern objects overlap to provide a continuous exposure pattern along the desired exposure trace.

26 Claims, 4 Drawing Figures

PHOTOPLOTTER

DESCRIPTION

BACKGROUND OF THE INVENTION

The present invention relates to photoplotters wherein a photosensitive media is exposed in accordance with a desired graphic design.

Graphic recorders are known to the prior art. Among those that have been used are the well known pen plotters wherein a media and one or more pens are moved relative to each other to produce the desired graphics, often under the control of a numerical controller or computer. However, many applications require a control of line width beyond that easily attained with a pen plotter, partly because of difficulties in controlling the widths of the plotted lines due to ink flow problems.

The desired use may also place restrictions on the graphic recorder. For example, many manufacturing applications require a transparency which can be used as a mask, such as that used in the etching of printed circuit boards. Graphic production on another media and transfer to a transparency requires a photographic process, which may, itself, contribute to inaccuracies in the mask. Line width variations may be further compounded when there is a significant size difference between the plot, as produced, and the plot, as applied.

Because of the above-noted difficulties, photographic plotters or photoplotters have come into use. However, photoplotters tend to be very expensive, massive and slow. In a typical photoplotter, a radiant energy pattern is generated on a photosensitive media, such as a photographic film, with the media and pattern being moved relative to each other in accordance with the desired exposure trace on the media. For example, a shaped light beam may be directed at a film from a stationary light source with the film being moved relative to the pattern formed by the light beam on the film. Conventional designs employ two platforms for film support and movement, each movable in a direction orthogonal to the movement direction of the other and with one platform supported for movement with the other. With the film size requirements of modern applications, such platforms are large and heavy. Accordingly, the systems that move the platforms are necessarily massive, and often slow. A separate moving system for each platform is commonly employed, typically having a driven lead screw fastened each platform.

One common lead screw/platform drive mechanism employs a high-precision lead screw which is turned by means of a stepper motor. Maintaining the position of the platforms, and thus the film, to a high accuracy (less than 1 mil, for example) requires the use of expensive components and, again, massive supporting structures. Other approaches suggest that the film be held stationary while the device that generates the exposing light beam is moved relative to the film. While this appears to reduce the problems discussed above, those problems are reduced only in degree and continue as complicating factors.

BRIEF DESCRIPTION OF THE INVENTION

The present invention provides a photoplotter wherein a radiant energy pattern is generated on a photosensitive media with a relative movement being produced between the media and radiant energy pattern in accordance with a desired exposure trace on the media. A difference between the actual and desired relative movement between the media and pattern is detected with the pattern being varied in response to that difference to compensate for the difference. In this manner, position errors resulting from the primary relative movement producing mechanisms are compensated for without the requirement that those mechanisms be high precise mechanisms. Also, overall drawing accuracy is not affected by position errors of the kind in which the moving mechanism lags or leads the desired position, such errors in positioning being commonly encountered in systems involving high velocities and accelerations. That kind of position error is a primary factor that leads to low speed operation of prior art photoplotters. Within this specification and claims, the term "vary" is intended to embrace a compensation in the radiant energy pattern which is in addition to the primary relative movement producing mechanisms.

In a preferred embodiment of the present invention, the radiant energy pattern is generated by a pattern generator having a face with an alterable pattern object corresponding to the desired radiant energy pattern being displayed on that face. The radiant energy pattern is varied by varying the position of the pattern object on the pattern generator face. In a specific preferred embodiment, the pattern generator includes a cathode ray tube (CRT) which generates a pattern object trace on its display face while varying the position of the pattern object trace on the face in accordance with detected differences between actual and desired relative movement between the media and radiant energy pattern. In this embodiment, a pattern object trace on the CRT display face is a linear pattern having a length corresponding to the desired width of the exposure trace on the media. A series of such object traces are generated on the CRT face with the number of such pattern object traces generated per unit of time being dependent on the velocity of the relative movement between the media and pattern object. Variations in such CRT pattern object traces may be accomplished almost instantaneously which renders this embodiment of the present invention preferred.

DETAILED DESCRIPTION OF THE DRAWINGS

Figure 1:
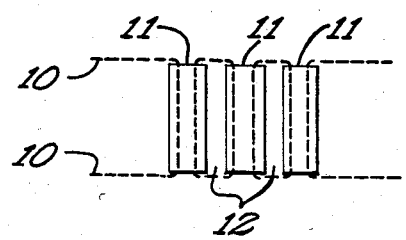
FIG. 1 illustrates the concept underlying the present invention.

FIG. 1 illustrates a concept underlying the present invention wherein parallel phantom lines 10 define the bounds of a straight line that it is desired to expose, the straight line having a width equal to the space between the phantom lines 10. In most photoplotter applications, it is desirable to have an even exposure over the entire area between the lines 10. However, typical prior art photoplotters employ a circular aperture to establish a circular exposure pattern having a diameter corresponding to the distance between the lines 10. The exposure of a line on a photosensitive medium by movement of such a light pattern results in a significantly greater exposure at the center (mid-way between the lines 10) than at the edges (adjacent the lines 10).

The uneven exposure noted above has been addressed by providing an aperture other than a round aperture, a rectangular aperture, for example. However, in such cases a change in direction of the desired exposure trace may require a change in orientation of the pattern generating aperture. This has been accomplished by a reorientation of the pattern generator unit. While an exposure trace may be more uniformly exposed with a non-circular aperture, the pattern generator reorientation is cumbersome.

The present invention addresses the problem of uneven exposure within the area between the phantom lines 10 by producing a series of linear radiant energy patterns on the media, each pattern extending between the phantom lines 10 in overlapping relation to adjacent patterns. That is, as illustrated in FIG. 1, a series of linear patterns 11 and 12 have their major dimension extending from one of the phantom lines 10 to the other of phantom lines 10 with adjacent patterns overlapping each other. Patterns 11 and 12 are identical to each other with patterns 12 being illustrated in phantom for the purpose of more clearly illustrating the overlapping relation between a pattern 11 or 12 and its adjacent pattern. The major dimension of the patterns 11 and 12 is perpendicular to the direction of the line being exposed (i.e., the direction of the phantom lines 10 at the area of exposure).

In a preferred embodiment, the patterns 11 and 12 are optically projected images of a pattern object trace generated on a CRT display face. Each of the patterns 11 and 12 result from one linear trace on the CRT display. The CRT object traces are produced, one for each "sweep" of the CRT beam across the screen, at a rate which insures that they slightly overlap the image or pattern previously produced, as illustrated in FIG. 1. Since each pattern 11 and 12 has a finite width (distance along the lines 10), the timing of the CRT sweeps is necessarily linked to the relative velocity between the pattern and the media on which it is projected. However, trace generation is easily controlled and linked to the relative movement velocity.

While described in the context of a straight line, with reference to FIG. 1, the CRT trace can be easily changed, in position or dimension, from one "sweep" to the next which makes it possible to draw objects other than single width lines, as by increasing or decreasing the CRT trace length as the trace image pattern on the media moves across its surface. With suitable controls, the objects that can be "drawn" include rectangles, circles, etc. Indeed, since no mechanical movements are necessary to change the sweep on the CRT display, virtually any shape may be "drawn", including alphanumeric characters.

A major advantage in using a CRT as a pattern generator is the fact that the position of the pattern object on the display face can be changed at high speed. The present invention employs this feature to compensate for errors in the relative position between the image pattern and photosensitive media. That is, given an intended or desired image pattern position at a particular media region but, due to positioning errors between the media image pattern, the image pattern is actually at a different media position, the pattern object may be varied, as by changing its location on the CRT display face, to position the image pattern in the intended media region. For this reason, the relative movement producing mechanisms need not be high performance nor is the speed of the system operation dependent upon the speed at which corrections can be accommodated by the positioning mechanism. Further, errors may occur for reasons other than positioning mechanism inaccuracies; vibrations may be transmitted to the photoplatter to produce position errors beyond that which may be tolerable in the intended plot. These, too, may be compensated for by the present invention which allows a reduction in the "stiffness" of the photoplatter mechanism.

In the disclosed embodiment, the present invention links the generation of pattern object traces to the velocity of relative movement between the photosensitive media and the pattern generator. Thus, during acceleration or deceleration there is a uniform film exposure without the requirement for variation in light or exposure intensity. Such light intensity variation is often employed in prior art systems to provide a uniform film exposure. The actual uniformity in such prior art devices is further dependent on the accuracy of the acceleration and deceleration.

While the present invention is described in the context of a cathode ray tube, it is to be understood that other light pattern generators may be employed to correct for positioning errors by repositioning a pattern image on a face of the pattern generator. For example, mechanial aperture plates of the type employed in prior art systems are relatively light in weight and may be repositioned by means of servo mechanisms responsive to film position error signals to compensate for errors in relative position. Although having some of the disadvantages of prior art systems, such servo mechanisms may be far faster-acting than a servo mechanism controlling movement of the entire pattern generator or film support. Further, an optical system may be employed or required to project an image trace from the pattern generator onto the film to be exposed. Manipulation of the optical system may also be employed, within the scope of the present invention, to vary the energy pattern on the film.

Figure 2:
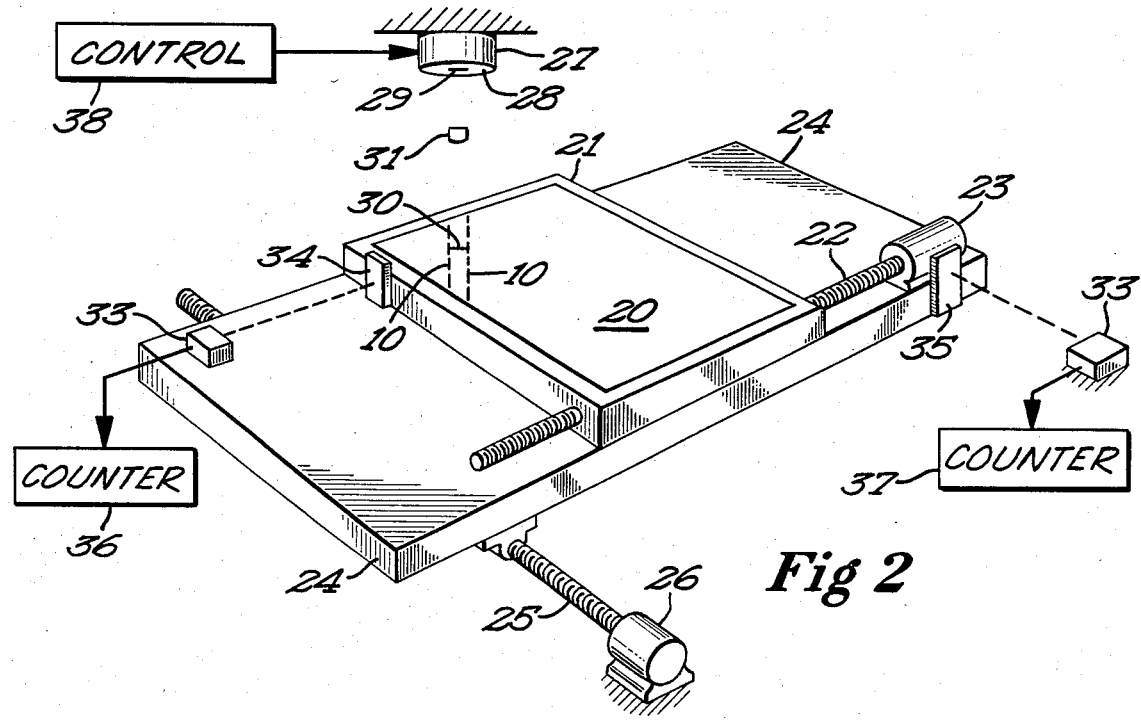
FIG. 2 diagrammatically illustrates the main mechanical and optical characteristics of the present invention.

FIG. 2 illustrates the mechanical aspects of a preferred embodiment of the present invention including a photosensitive media 20 in the form of a film carried by a first platform 21. The platform 21 is supported for movement in the longitudinal direction of a lead screw 22, the lead screw 22 being driven by a motor 23. The platform 21 will move along the lead screw 22 on rotation of that lead screw 22 by the motor 23, in known manner. The platform 21, lead screw 22 and motor 23 are supported for movement with a second platform 24 which is movable along the longitudinal direction of a lead screw 25, movement of the lead screw 25 being under the control of the motor 26. In this manner, as is known in the prior art, movement of the film 20 in two orthogonal directions may be accomplished and controlled.

A pattern generator 27 having a display face 28 may be employed to provide object in the form of a linear trace 29. As noted above, the pattern generator 27 is preferably a CRT. In the illustrated embodiment, the pattern generator 27 is stationary while the film 20 is moved, on movement of the platforms 21 and 24, such that a pattern image 30 of the pattern object 29 and the film 20 move relative to each other. Such movement may be similarly accomplished by movement of the pattern generator 27 relative to a support for the film 20 or by dual movement of the pattern generator 27 and the film 20, in known manner. Movement of the film 21 in one direction and the pattern generator 27 in an orthogonal direction is, in some instances, preferable to orthogonal movement of the film 21 alone. A factor in determining this preference is the size of the film and its affect on the size of the film supporting structure. Since the present invention provides an improvement that may be employed in any relative movement producing mechanism and such mechanisms are well known, only one is illustrated for the sake of clarity. Supports, such as bearings, which allow any of the noted relative movements are well known.

In the embodiment illustrated in FIG. 2, the desired trace is a straight line defined by the phantom lines 10 with the image pattern 30 corresponding to one of the elements 11 or 12 of FIG. 1. Element 31 in FIG. 2 represents any optical element necessary to project the object pattern 29 as the image pattern 30, with suitable expansions or reductions, dependent on the application. Counters 36 and 37 and control 38 will be described below with reference to FIGS. 3 and 4.

With the exception of a CRT serving as pattern generator 27, the system illustrated in FIG. 2 that is described to this point corresponds to known prior art photoplotters. Also known to the prior art are the use of laser interferometers illustrated generally at 33 in FIG. 2 one of the interferometers 33 being cooperatively positioned relative to a reflecting element 34 carried by the platform 21 and the other being cooperatively positioned relative to a reflecting member 35 carried by platform 24. In the known prior art systems, the output of the interferometers 33 have been employed as inputs to servo mechanisms by which the motors 23 and 26 are controlled.

The control of any sophisticated prior art graphic plotter is a complex operation. Typically, an external computer controls the movement of a pen or light beam along the media on which a drawing is to be produced by presenting the plotter circuits with a series of coordinate points indicating where the pen or light beam should next proceed. Servo mechanisms produce the necessary motions with position sensors indicating to the servo mechanism circuits the location of the moving member. With that information, and information from the computer as to where the moving member should be, an error signal is produced. The error signal is amplified and employed to energize the relative movement producing motor or motors.

The computer programs needed to generate information for controlling the movement of the system components of the present invention are complex. However, such programs are very similar to those of existing pen plotters. Indeed, the variations from existing programming necessary to implement the present invention are well within the abilities of those ordinarily skilled in the art and, therefore, will not be discussed in detail.

In the preferred embodiments of the present invention, it is necessary that a series of coordinate point values (the desired X and Y coordinate values of the center of each linear image pattern, for example) be provided at rates compatible with the acceleration and velocity capabilities of the driving motors, and the inertia of the moving members. Once steady state speed is attained, the rate of change of coordinate values must be still limited to at least a little below the velocity capability of the system, the velocity capability of the system being in part a function of the brightness of the image pattern and the sensitivity of the photosensitive surface. In addition to coordinate values, the computer provides information which relates to object pattern length, which corresponds to line width on the exposed film, object pattern width and angular orientation of the object pattern. The angular orientation of the object pattern is such that a pattern image on the media is at right angles to the direction of the line being constructed on the media. Additionally, the pattern generator may be turned off to accommodate those instances when no exposure of the film is desired, as when moving from one drawing object to the next where no interconnecting line between those objects is desired.

Figure 3:
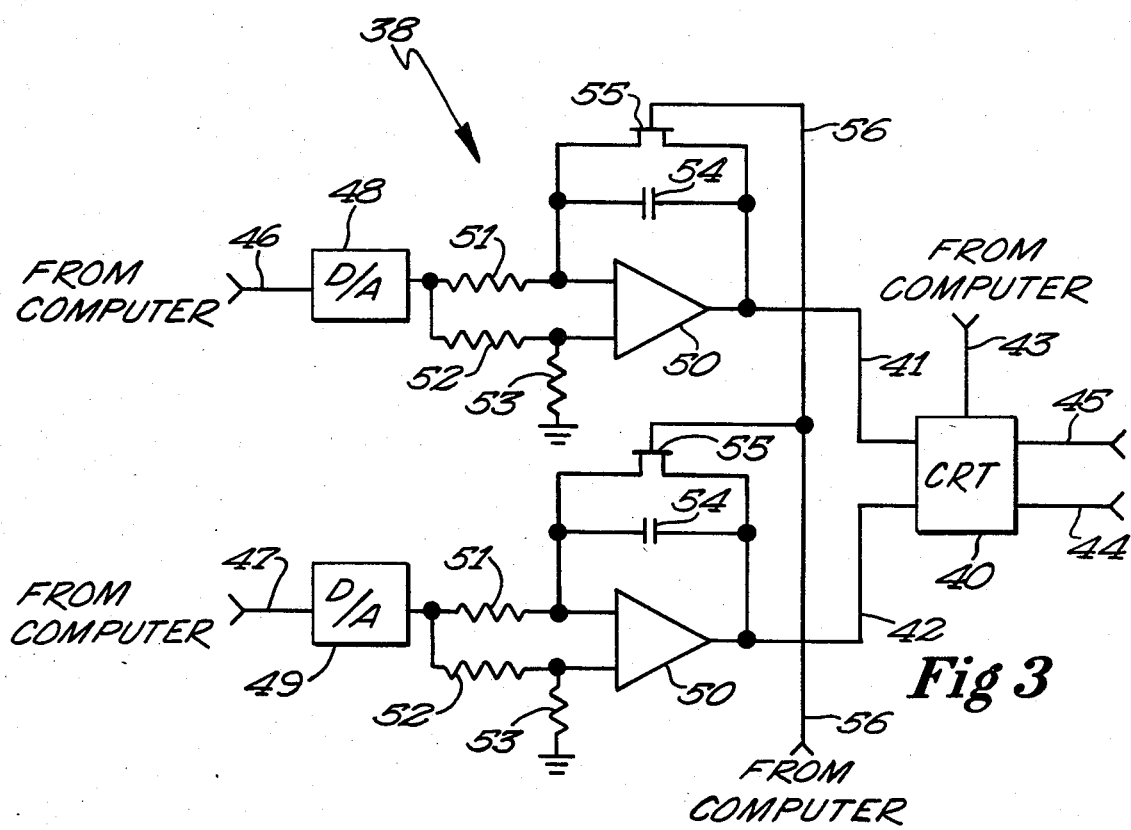
FIG. 3 illustrates a cathode ray tube and associated control circuitry forming a portion of a preferred embodiment of the present invention.
Figure 4:
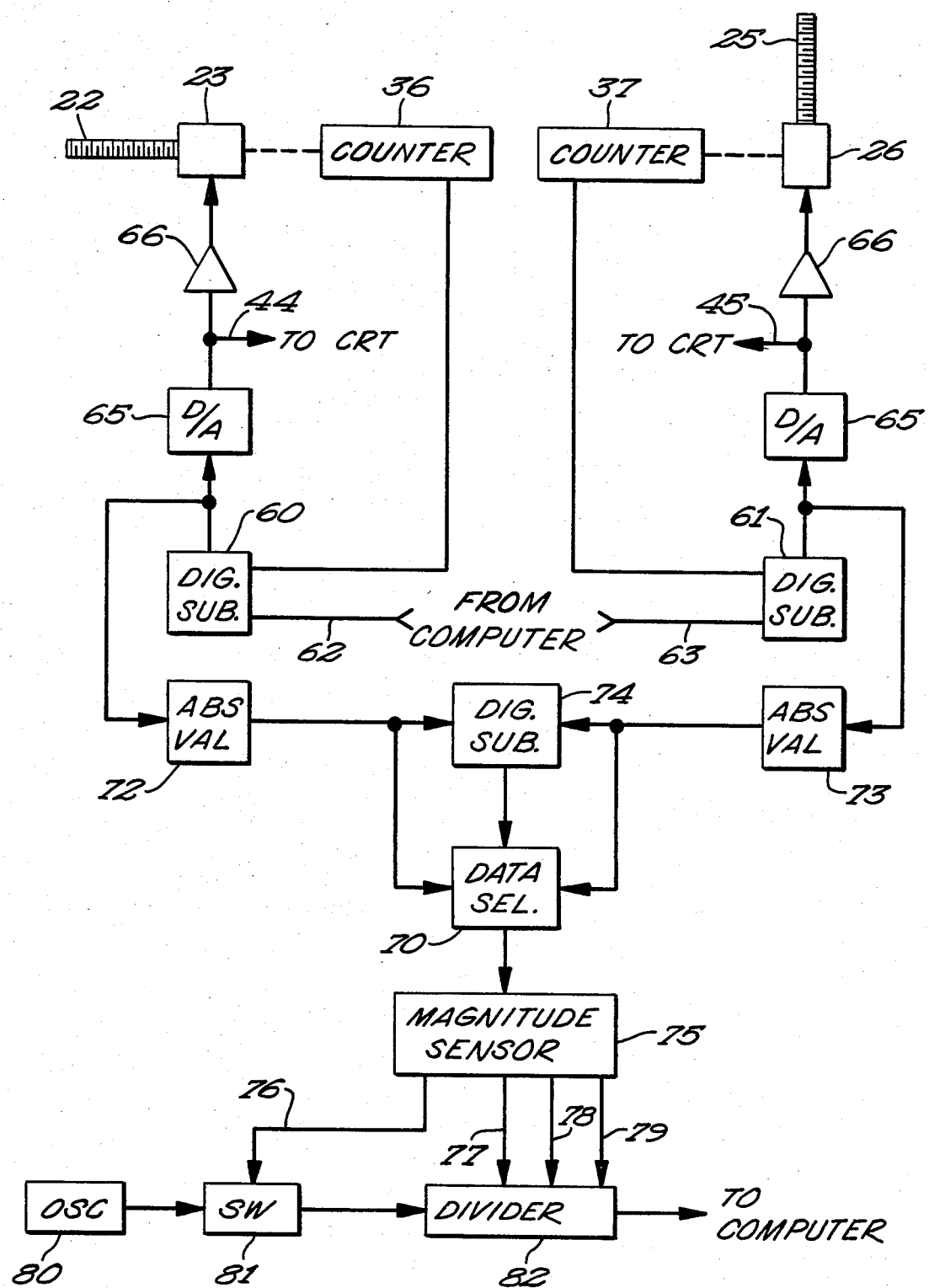
FIG. 4 illustrates, in schematic form, the control functions of a portion of a preferred embodiment of the present invention.

FIG. 3 illustrates a CRT 40, which is employed in the illustrated preferred embodiment of the present invention, and its control (designated generally as 38 in FIG. 1). For the purposes of this discussion, the control signals may be referenced to the "X" and "Y" axis, it being understood that these references are, more or less arbitrarily, references to mutually perpendicular axes. A Y axis deflection signal is provided via line 41 to CRT 40, while an X axis deflection signal is provided via line 42. A trace width control signal is presented via line 43 from a computer (not shown), while X and Y axis trace position correction signals are presented via lines 44 and 45, respectively. Lines 44 and 45 are illustrated in FIG. 4 and will be discussed more fully with reference thereto.

A sine value signal is provided to the circuitry of FIG. 3 via a line 46, while a cosine value signal is provided via a line 47. The sine and cosine value signals are digital in form and are variables dependent on the desired length of the trace and the sine or cosine, respectively, of the angle at which the trace is to be generated on the face of the CRT. For an angle of 30° and a trace length of 200 units, the "sine value" would be 200 (sin 30) and the "cosine value" would be 200(Cos 30).

Lines 46 and 47 are connected to digital to analog converters 48 and 49, respectively. The outputs of digital to analog converters 48 and 49 are connected to sweep circuits whose outputs are connected to lines 41 and 42, each sweep circuit including an amplifier 50, resistors 51-53, capacitor 54 and FET 55. The gate of FETs 55 are connected to line 56, the line 56 be connected to receive a sweep signal from the controlling computer.

The sweep circuits are integrators when FETs 55 are in the nonconducting state. When FETs 55 are in the conducting state, the output voltage of the amplifier 50 associated with converter 48 is a sine function, while the output of the amplifier 50 associated with converter 49 is a cosine function. When the signal on line 56 becomes positive, the FETs 55 are rendered nonconducting, so integration begins. For the purposes of this discussion, it will be assumed that the circuit elements having like reference numerals have like values and that the deflection sensitivities of CRT 40 are the same for both horizontal and vertical deflection. The term "time constant," as used herein, refers to the product of the resistance of resistor 51 and the capacitance of capacitor 54, in ohms and farads, respectively.

If the constants of proportionality of converters 48 and 49 are adjusted such that a particular deflection voltage produces a deflection of one inch (if the beam is on), then the starting point for a trace would lie somewhere on a circle having a one-inch radius centered on the screen-assuming no position correction voltages applied to conductors 44 and 45. That is, the initial voltages would position the beam somewhere on a two-inch diameter circular locus. At a time equal to the time constant, the beam would be located at screen center and, at a time equal to twice the time constant, it would be located at the opposite point on the same two-inch circle. This is so because, for each integrator, whatever the initial voltage, the output will decrease by that amount in a time corresponding to the time constant. In a specific case, in which the sine value is zero and the length of the desired trace is 2 in., the initial point of the trace is one inch left of screen center with the trace progressing through screen center to a point one inch to the right of screen center. At the time that the end of the trace is reached, the computer is required to provide a signal to turn off the CRT beam, the computer being programmed to calculate the time duration of trace generation in order to produce the signal to turn the beam off, and to reset the integrating circuits. The trace angle, with respect to horizontal, can therefore be controlled by the computer through the provision of sine and cosine values on lines 46 and 47 which are necessary to keep the image on the media at right angles to the direction in which the pattern image is moving relative to the film.

The time of occurrence of each sweep is controlled by the computer, via line 56, to be a few microseconds after the transmission of new coordinate information to allow a new error signal to "settle" before a sweep actually begins. The "sweep" control signal initiates the linear voltage ramps applied to the vertical and horizontal deflection plates of the CRT 40. For a visible trace two inches long, the CRT 40 beam is caused to be turned on, via the signal on conductor 43, at the same moment that the deflection voltage sweeps begin. The computer signals the beam to remain on for two time constants. For a visible trace one inch long, the beam is turned on at a time equal to one-half the time constant to remain on for a time equal to one time constant.

The computer "knows" where the image is located on the CRT 40 display face in the sense that the image always appears where the computer last told it to be, regardless of delays in the mechanical film transport assembly. The system of the present invention provides an essentially instant correction for such delays. Thus, the computer can be programmed to produce sweeps according to the distance that an image pattern has traveled, relative to the film; there is no time dependence. This makes it practical to overlap the image patterns resulting from successive traces on the CRT, regardless of the velocity of relative movement between the image pattern and media.

FIG. 4 illustrates a block diagram, including lines 44 and 45 (see FIG. 3), motors 23 and 26, lead screws 22 and 25 and counters 36 and 37 (see FIG. 2). The dashed lines between the counters and motors indicate their association through the interferometers 33 (See FIG. 2). Counters 36 and 37 are 20-bit up-down counters. This means that they can count up to approximately one million fringes or interferometer output signals which corresponds to movement of the corresponding platform for a distance of one million wave lengths of the interferometer lasar light. With HeNe lasars, having a wave length of approximately 25 micro-inches, the counters are capable of counting fringes for approximately 25 inches of travel. However, in many applications, measurement of accuracy to this degree is excessive when compared to the resolution of the CRT 40. Therefore, only the upper 16 bits of the counters 36 and 37 need by utilized. The 16 bits also correspond to typical computer usage.

Still referring to FIG. 4, digital subtraction circuits 60 and 61 provide a signal representative of the difference between actual and desired platform positions. For example, subtraction circuit 60 receives a 16-bit signal representative of desired X axis platform position via line 62, while subtraction circuit 61 receives a corresponding Y axis desired position via line 63. The actual X axis position is provided to the digital subtraction circuit 60 from counter 36, while the actual Y axis position is provided to digital subtraction circuit 61 from counter 37. The output of these subtraction circuits 60 and 61 indicates the magnitude and sign of the position error in the X axis and Y axis, respectively. These error signals may be used, after conversion to analog form, to correct the trace position by altering the location on the CRT display face of the next trace to be generated. The error signals may also be used as error signals to correct the mechanical position error of the platform involved, as well as to determine whether or not the rate of presentation of new position coordinates should be maintained. These functions are described below.

Subtraction circuits 60 and 61 are well-known digital devices which produce signed numbers (positive or negative), according to the differences between the inputs. The digital output from the subtraction circuits 60 and 61 is converted to an analog signal, in known manner, by digital to analog converters 65, whose outputs are connected for control of CRT horizontal and vertical deflection, via lines 44 and 45, respectively, in known manner. The analog output of converter 65 is also applied to servo amplifiers 66 which produce output voltages of proper polarity to cause the motors 23 and 26 to reposition the platforms in a manner which decreases the position error. As can be seen, information from the computer indicating a desired change in platform position is treated by the disclosed embodiment as a position error to result in an activation of the motors 23 and 26, as well as an alteration signal applied to the CRT deflection circuits. The latter is almost instantaneous, which provides a major advantage in the present invention.

New coordinate information is transmitted via lines 62 and 63 in synchronization with the other computer generated data (sine and cosine values, as well as trace position and dimension). However, the "sweep start" signal (line 56 in FIG. 3) is transmitted a few microseconds following the receipt of coordinate and angle information which allows the sweep generating circuits of FIG. 3, and the subtraction and converter circuits of FIG. 4, to assume a steady state condition. Also, the synchronization insures that requests for new coordinate information, to be described below, and other actions will not occur during the time that either of the counters 36 and 37 is changing state as a result of outputs of the interferometers 33 (see FIG. 2). During such a state change, the counter output signals are in an indeterminate condition which can result in gross errors (briefly) at the outputs of subtraction circuits 60 and 61. While many alternatives may be employed to prevent this, the present invention contemplates the use of sample and hold circuits which are normally in the "sample" condition, but are placed into the "hold" condition for a few microseconds following either the occurrence of an interferometer pulse or a request for new information from the computer. These few microseconds, ten for example, are brief enough to insure that a significant actual change in film position cannot occur nor can there be significant delays in error correction. The outputs of subtraction circuits 60 and 61 may be false, at what appears to be critical times, but this does not happen often, and any such occurrence can result in no more than a premature, or delayed, request for new information from the computer. If such effects were of consequence, data selector 70, to be described, could readily be converted to a "clocked" data selector which is clocked at a safe time following data changes. Such clocked data selectors are well known, but are not preferred for reasons of simplicity.

Data selector 70, and the components associated therewith in FIG. 4, provide requests for new coordinate information from the computer. The basis for calling for new information is the ability to correct by trace repositioning on the CRT. Absolute value circuits 72 and 73 are connected to the outputs of digital subtraction circuits 60 and 61, respectively, absolute value circuits being well known to the prior art. The output of absolute value circuits 72 and 73 are transmitted to a digital subtraction circuit 74 and to the data selector 70. Accordingly, subtractor 74 receives indications of the magnitude of both the X and Y film position errors. The subtractor 74 is designed to provide a positive output if the subtrahend input is the same as or less than the minuend input. The design of such subtraction circuits is well known to the prior art, their purpose being to indicate which of the errors is greater. The greater error is that which is employed by the logic circuitry in determining whether or not new coordinate information should be requested from the computer and the rate it should be requested, if at all. The X position error (from absolute value circuit 72) is the minuend input, while the Y position error from absolute value circuit 73 is the substrahend input. The output of data selector 70 corresponds to the X position error (the output of absolute value circuit 72) if the control signal from the subtractor circuit 74 is positive. If the Y position error is greater, it will appear at the output of data selector 70. Thus, the largest of the errors will appear at the output of data selector 70.

The output of data selector 70 is applied as an input to a magnitude sensor 75. Magnitude sensor 75 has four outputs 76-79. The output on line 76 is positive the magnitude of the largest position error (from data selector 70) does not exceed the ability of the CRT to compensate. In a preferred embodiment, that error is considered to correspond to 16,384 interferometer fringe lengths so that the magnitude sensor 75 is designed to produce a negative output on line 76 if any bit of the signal presented from data selector 70, beyond the 14th bit, is a "one." Line 77 is negative if any bit beyond the 13th bit is a "one," while line 78 and line 79 are negative if a bit beyond the 12th and 11th is a "one," respectively. The design of such a magnitude sensor is easily accomplished to one ordinarily skilled in the art of digital circuit design.

Oscillator 80 is a 1K Hz oscillator whose output is connected through a switch 81 to a frequency divider 82. Switch 81 passes pulses from the oscillator 80 to the divider 82 when the signal on line 76 is positive. Thus, the oscillator output is applied to divider 82 if the position error is not too large to be compensated by the CRT. The divider 82 divides the oscillator output by eight if the line 77 is negative; by four if the line 78 is negative; and by two if the line 79 is negative. Thus, if none of the inputs 77-79 is negative, the output of divider 82 is a 1K Hz pulse train, which results in a request of new coordinate positions from the computer at the oscillator rate. As the error increases, lines 79, 78 and 77 will become sequentially negative to result in a decrease in a pulse rate from the divider 82 and, accordingly, a decrease in the rate of new coordinate position requests to the computer. An error sufficient to produce a negative output on line 76 will result in a blocking of oscillator outputs 80 from the divider 82 to result in a discontinuation of new coordinate position data requests until the error decreases. The frequency dividers of the type described, and their design, are known to the prior art.

A variety of programming techniques can be employed for graphic plotter control to produce the desired graphics. One approach is to represent, in memory, the desired graphics as a number of line vectors. For example, a circle may be represented as a large number of short, connecting vectors, the end points of which all lie on a circular locus of the desired diameter. A listing of these end points is easily produced by one of ordinary skill in the art and is beyond the scope of the present invention. However, for the sake of understanding the present invention, the manner of computer control will be discussed. For the sake of that discussion, assume that a line segment is to be drawn from coordinate (0.750, 1.000) to coordinate (1.000, 1.250). This is a straight line which is at 45° from vertical. The computer, by ordinary well-known methods, generates a series of coordinate points lying approximately on the 45° line and records these as a list in memory. These coordinate points will have a separation determined by the system operating parameters from the starting point to the end point. The abscissa values are given by the relationship 0.750+kn(sin 45°), where k is the separation between points and n is the nth point, the starting point being the zero point. The ordinate values are similarly calculated as cosine functions, and listed.

During the actual drawing or exposure process, the coordinate values are read sequentially from memory with each new coordinate value being accompanied by a "sweep" command and a suitably timed "beam on" command to provide the desired line segment trace and resulting image pattern on the media to be exposed. The width of each trace should be selected to provide an overlap between successive pattern images, while the length of each trace is determined by the desired width of the line being exposed.

Clearly, if the computer is fast, it could produce coordinate position values many times faster then the photoplotter mechanism can follow. This could result in errors beyond the ability of the system to correct or compensate for. Compensation for acceleration and deceleration capabilities of the servo mechanisms also involves exceedingly complex calculations. Thus, reliable operation requires a transmission of new coordinate values at a rate which insures that the computer does not exceed the ability of the plotting mechanism to follow.

The plotter of the present invention is designed to call for new coodinate information at rates which the mechanism can "keep up" with. The basis used to call for new position coordinates is the presently existing position error. No new coordinate is called if the error exceeds an excessive value. The resulting pause allows the mechanism to "catch up." For lower error magnitudes, new coordinates are requested at a rate roughly inversely proportional to the existing error, but not exceeding th rate at which new sweeps can be generated by the CRT, and associated circuits. This optimizes the drawing speed, for a given photoplotter, and simplifies the programming in that it is completely independent of the dynamics of the plotter.

The discussion above assumes that a linear element trace will have a width slightly greater than the separation between coordinate positions stored by the computer such that successive image patterns resulting from successive linear element traces on the CRT display face with overlap on the photosensitive media. The less the separation, the greater the amount of overlap for a given trace width. With any overlap, the overlapped regions will be multiply exposed. With a high sweep travel across the CRT display face, this is very permissible. However, as a practical matter, it is easier to produce slow sweeps accurately. For the interest of simplicity in the disclosed embodiment, it is preferred that a single sweep occurs once per mil of image pattern length, with the coordinate points within the computer resulting in nominal image pattern separation of approximately one mil, within the requirement that they overlap.

Concurrently with new coordinate value information, the computer supplies angle information to provide proper orientation of the image patterns on the photosensitive media. This orientation information may be calculated or located in a look-up table for transmission to the photoplotter at a time just prior to the generation of a pattern object trace on the CRT display face. Several microseconds should be allowed for the sweep voltage generating circuits to reach a steady state.

Obviously, many modifications and variations of the present invention are possible in light of the above teachings. For example, it should be recognized that, if the angle between two adjacent pattern images is appreciable, there may be portions of those pattern images that do not overlap. However, this is not unlike similar occurrences in the use of penplotters in those instances where "thick" lines are constructed by drawing a number of overlapping narrower lines. There are many ways in which any difficulties resulting from this fact can be overcome with a particular choice having no bearing upon the principles or objectives of the present invention. Also, the drive mechanisms for the disclosed embodiment may take any form while a moving media platform may be replaced by a drum around which the media is secured. In the latter instance, drum rotation takes the place of platform displacement in the determination of media position. Finally, the particular servo loop disclosed forms no part of the present invention, except in cobmination. Other, higher performance systems may be easily adapted to the present invention, including the provision of position information from the counters 36 and 37 to the external computer and motor control by the computer that takes velocities into account in its programming. It is, therefore, to be understood that, within the scope of the appended claims, the invention may be practiced otherwise than as specifically described.

What is claimed is:

1. In a photoplotter of the type having means for supporting photosensitive media, means for generating a radiant energy pattern on said photosensitive media with said pattern generating means having a face and means for displaying an alterable pattern object on said face, and means for producing relative movement between said photosensitive media and a radiant energy pattern thereon, said relative movement being in accordance with a desired exposure trace on said photosensitive media, the improvement which comprises means for detecting a difference between actual and desired relative movement between said photosensitive media and radiant energy pattern and means responsive to said difference for selectively varying the position of said pattern object on said face of the pattern generating means to vary the position of said radiant energy pattern to compensate for said difference.

2. The photoplotter of claim 1 wherein said pattern generating means comprises CRT means having a display face and means for generating a pattern object trace of said display face, said selectively varying means varying the position of said pattern object trace on said display face.

3. The photoplotter of claim 1 wherein said varying means varies the display of said pattern object.

4. The photoplotter of claim 1 wherein said pattern generating means comprises CRT means having a display face and means for generating a pattern object trace on said display face.

5. The photoplotter of claim 4 wherein said pattern object trace generating means comprises means for altering the dimensions and orientation of said pattern object trace.

6. The photoplotter of claim 5 wherein said varying means comprises means for selectively varying the position of said pattern object trace on said display face.

7. The photoplotter of claim 4 wherein said varying means comprises means for selectively varying the position of said pattern object trace on said display face.

8. The photoplotter of claim 1 wherein said relative movement producing means comprises means for moving said photosensitive media supporting means in accordance with said desired exposure trace.

9. The photoplotter of claim 8 wherein said pattern generating means comprises CRT means having a display having a display face and means for generating a pattern object trace on said display face, said selectively varying means varying the position of said pattern object trace on said display face.

10. The photoplotter of claim 8 wherein said varying means varies the display of said pattern object.

11. The photoplotter of claim 8 wherein said pattern generating means comprises CRT means having a display face and means for generating a pattern object trace on said display face.

12. The photoplotter of claim 11 wherein said pattern object trace generating means comprises means for altering the dimensions and orientation of said pattern object trace.

13. The photoplotter of claim 12 wherein said varying means comprises means for selectively varying the position of said pattern object trace on said display face.

14. The photoplotter of claim 8 wherein said said moving means comprise lead screw means, said difference detecting means comprising laser interferometer means.

15. The photoplotter of claim 14 wherein said varying means varies the display of said pattern object.

16. The photoplotter of claim 14 wherein said varying means varies the display of said pattern object.

17. The photoplotter of claim 14 wherein said pattern generating means comprises CRT means having a display face and means for generating a pattern object trace on said display face.

18. The photoplotter of claim 17 wherein said pattern object trace generating means comprises means for altering the dimensions and orientation of said pattern object trace.

19. The photoplotter of claim 18 wherein said varying means comprises means for selectively varying the position of said pattern object trace on said display face.

20. The photoplotter of claim 1 wherein said radiant energy pattern comprises a linear pattern generally perpendicular to said desired exposure trace.

21. The photoplotter of claim 1 wherein said pattern generating means comprises CRT means having a display face and means for generating a linear pattern object trace on said display face, the orientation and dimensions of said linear pattern object trace being alterable.

22. The photoplotter of claim 21 wherein said relative movement producing means comprises means for moving said photosensitive media supporting means in accordance with said desired exposure trace.

23. The photoplotter of claim 22 wherein the number of linear pattern object traces generated per unit of time is dependent on the velocity of said photosensitive media supplying means.

24. The photoplotter of claim 23 wherein said moving means comprise lead screw means, said difference detecting means comprising laser interferometer means.

25. The photoplotter of claim 1 wherein said pattern object display means comprises means for altering the dismensions and orientation of said pattern object.

26. The photoplotter of claim 1 wherein said pattern generating means comprises CRT means.

* * * * *